(12) United States Patent
Chowdhary et al.

(10) Patent No.: US 10,260,877 B2
(45) Date of Patent: Apr. 16, 2019

(54) RECONFIGURABLE SENSOR UNIT FOR ELECTRONIC DEVICE

(71) Applicant: STMicroelectronics, Inc., Coppell, TX (US)

(72) Inventors: Mahesh Chowdhary, San Jose, CA (US); Sankalp Dayal, Santa Clara, CA (US)

(73) Assignee: STMicroelectronics, Inc., Coppell, TX (US)

( * ) Notice: Subject to any disclaimer, the term of this patent is extended or adjusted under 35 U.S.C. 154(b) by 186 days.

(21) Appl. No.: 14/749,118

(22) Filed: Jun. 24, 2015

(65) Prior Publication Data

US 2016/0252542 A1 Sep. 1, 2016

Related U.S. Application Data

(60) Provisional application No. 62/121,104, filed on Feb. 26, 2015.

(51) Int. Cl.
*G01C 19/32* (2006.01)
*G01C 19/5776* (2012.01)
*G01P 15/18* (2013.01)

(52) U.S. Cl.
CPC ......... *G01C 19/32* (2013.01); *G01C 19/5776* (2013.01); *G01P 15/18* (2013.01)

(58) Field of Classification Search
CPC .. G06F 1/163; G06F 17/30867; G06F 3/0619; G06F 11/1068; G06F 3/064; G06F 3/0679; G06F 19/3418; G06F 1/1647; G06F 21/32; G06F 3/011; G06F 3/0416; G06F 3/04847; G06F 3/0659; G06F 3/1423

See application file for complete search history.

(56) References Cited

U.S. PATENT DOCUMENTS

| | | | |
|---|---|---|---|
| 2011/0215952 A1* | 9/2011 | Aria | G06F 3/017 341/20 |
| 2014/0201126 A1 | 7/2014 | Zadeh et al. | |
| 2015/0039260 A1* | 2/2015 | Niskanen | G06K 9/6244 702/141 |

(Continued)

OTHER PUBLICATIONS

Alanezi et al. (Impact of Smartphone position on sensor values and Context Discovery, May 1, 2013).*

(Continued)

*Primary Examiner* — Roy Y Yi
(74) *Attorney, Agent, or Firm* — Crowe & Dunlevy

(57) ABSTRACT

An electronic device includes a printed circuit board (PCB) having at least one conductive trace thereon. A system on chip (SoC) is mounted on the PCB and electrically coupled to the conductive trace. A sensor chip is mounted on the PCB in a spaced apart relation with the SoC and electrically coupled to the conductive trace such that the sensor chip and SoC are electrically coupled. The sensor chip includes an accelerometer and/or a gyroscope, and a control circuit. The control circuit is configured to receive configuration data as input, acquire data from the accelerometer and/or the gyroscope. The control circuit is also configured to process the data so as to generate a context of the electronic device relative to its surroundings, the processing being performed in using a processing technique operating in accordance with the configuration data, and output the context.

28 Claims, 2 Drawing Sheets

(56) References Cited

U.S. PATENT DOCUMENTS

2015/0062130 A1* 3/2015 Ho .................... G06T 13/00
  345/473

OTHER PUBLICATIONS

Miluzzo, Emiliano & Papandrea, Michela & D Lane, Nicholas & Iu, Hong & T Campbell, Andrew. (2011). Pocket, Bag, Hand, etc.*
First Office Action and Search Report from co-pending CN Appl. No. 201510510921.7 dated Mar. 20, 2018 (8 pages).

* cited by examiner

RECONFIGURABLE SENSOR UNIT FOR ELECTRONIC DEVICE

PRIORITY CLAIM

This application claims the priority benefit of U.S. Patent Application No. 62/121,104, filed on Feb. 26, 2015, the contents of which are hereby incorporated by reference in their entirety to the maximum extent allowable by law.

TECHNICAL FIELD

This disclosure relates to the field of sensors, and more particularly, to reconfigurable sensors for electronic devices.

BACKGROUND

Portable electronic devices such as smartphones, smartwatches, other wearables, and tablets are ever more popular in the world today. Certain functions of these devices depend on the device having a knowledge of the device's orientation, or of conditions of the environment in which the device currently resides. For example, a smartphone may rotate its user interface from a portrait view to a landscape view based upon the orientation in which the smartphone is held. As another example, a smartwatch may activate its display or alter the brightness of its display based upon the orientation in which the smartwatch is held, or based upon the light in the environment in which the smartwatch resides, respectively. Such portable electronic devices may also log the physical activity of a user. For example, a smartphone or smartwatch may count the number of steps taken by a user.

In order to determine the orientation of the device or conditions of the environment in which the device resides, sensors such as accelerometers and gyroscopes are employed. Typically, the electronic device includes a system on chip (SOC) that receives raw data from the sensors, and then determines the device orientation or conditions of the environment.

While this approach is effective and enables the electronic device to perform commercially desirable functions, the constant acquisition of data from the sensors by the SOC can result in higher than desirable power consumption. The lowering of power consumption is a continual commercial desire for such electronic devices. Therefore, hardware and techniques for allowing the continual acquisition of the sensor data while reducing power consumption are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electronic device includes a printed circuit board (PCB) having at least one conductive trace thereon. A system on chip (SoC) is mounted on the PCB and electrically coupled to the conductive trace. A sensor chip is mounted on the PCB in a spaced apart relation with the SoC and electrically coupled to the conductive trace such that the sensor chip and SoC are electrically coupled. The sensor chip includes an accelerometer and/or a gysoscope, and a control circuit. The control circuit is configured to receive configuration data as input, acquire data from the accelerometer and/or the gyroscope. The control circuit is also configured to process the data so as to generate a context of the electronic device relative to its surroundings, the processing being performed in using a processing technique operating in accordance with the configuration data, and output the cTntext.

The electronic device may include at least one additional sensor, and the SoC may be configured to acquire additional data from the at least one additional sensor. The control circuit may be further configured to receive the additional data from the SoC, and to process the data and the additional data when generating the context of the electronic device relative to its surroundings.

The at least one additional sensor may be selected from a group consisting of: a barometer, a magnetometer, a proximity sensor, a microphone, a touch sensitive display, and a light sensor.

The electronic device may include a transceiver, and the SoC may be configured to receive, via the transceiver, updated configuration data from an external server. The control circuit may be configured to process the data so as to generate the context of the electronic device relative to its surroundings, by performing the processing using the processing technique operating in accordance with the updated configuration data.

The control circuit may include a plurality of configuration registers into which the configuration data is received as input. The control circuit may include a programmable logic device configured to perform the processing using the processing technique in accordance with the configuration data from the plurality of configuration registers.

Another aspect is directed to a sensor chip mounted on a printed circuit board (PCB) and electrically coupled to a system on chip (SoC) mounted on the PCB via at least one conductive trace. The sensor chip includes an accelerometer and/or a gyroscope. A control circuit is configured to receive configuration data as input and acquire data from the accelerometer and/or the gyroscope. The control circuit is also configured to process the data so as to generate a context of the electronic device relative to its surroundings, the processing being performed in using a processing technique operating in accordance with the configuration data, and output the context.

The control circuit may include a plurality of configuration registers into which the configuration data is received as input. The control circuit may also include a programmable logic device configured to perform the processing using the processing technique in accordance with the configuration data from the plurality of configuration registers.

The control circuit may be further configured to receive additional data from the SoC, and to process the data and the additional data when generating the context of the electronic device relative to its surroundings. The configuration data may be changeable parameters of the processing technique.

The changeable parameters may be latency and/or accuracy and/or power consumption. The changeable parameters may be an acquisition rate of the data and/or a range of accepted values of the data. In addition, the changeable parameters may be parameters of a digital filter applied by the processing technique.

In some cases, the changeable parameters may include first and second processing algorithms to be used by the processing technique in respective first and second modes, the second processing algorithm being less complex than the first processing algorithm, the second mode being a higher power consumption mode than the first mode.

The context of the electronic device relative to its surroundings may be a location of the electronic device relative to a body of its user. The context of the electronic device relative to its surroundings movement of the electronic device in a gesture indicating that a user thereof is intending to look at the electronic device. The context of the electronic device relative to its surroundings may be a form of locomotion currently being employed by a user of the electronic device. The configuration data may be which features of the data to compute.

The features of the data may be selected from a group consisting of: a mean acceleration of the electronic device, a deviance of acceleration of the electronic device, rotational acceleration of the electronic device, linear acceleration of the electronic device, a mean of roll, pitch, and yaw, a variance of roll, pitch, and yaw, a number of acceleration peaks in the data over a given period of time, a number of zero crossings in the data over a given period of time, peak values of the data over a given period of time, and magnitudes of acceleration of the electronic device at different points in time.

The control circuit may be further configured to receive updated configuration data from an external server, and the control circuit may be configured to process the data so as to generate the context of the electronic device relative to its surroundings, by performing the processing using the processing technique operating in accordance with the updated configuration data.

The control circuit may be further configured to receive updated configuration data from the SoC, and the control circuit may be configured to process the data so as to generate the context of the electronic device relative to its surroundings, by performing the processing using the processing technique operating in accordance with the updated configuration data.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
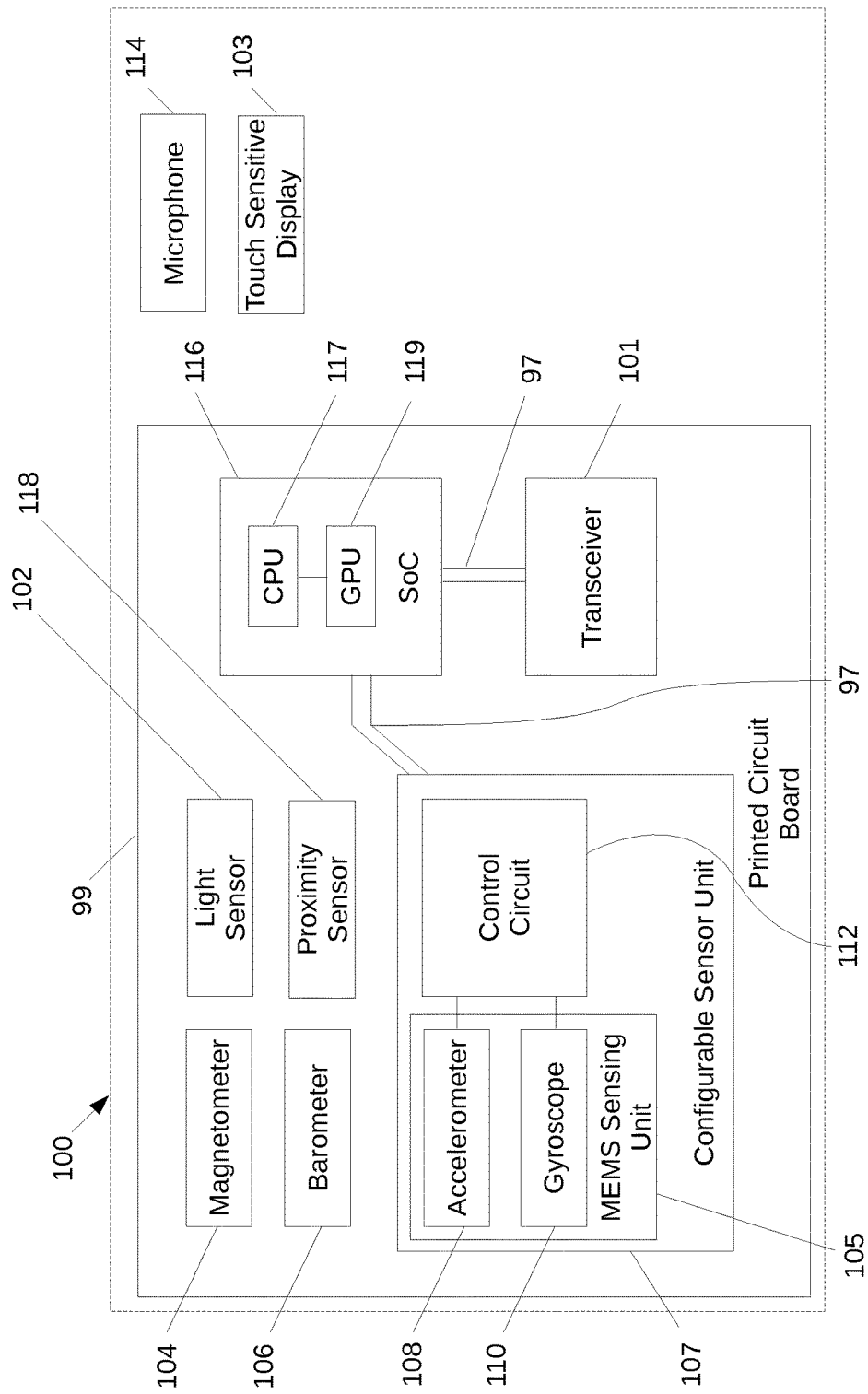
FIG. 1 is a schematic block diagram of an electronic device including a reconfigurable sensor unit in accordance with this disclosure.

With initial reference to FIG. 1, an electronic device 100 is now described. The electronic device 100 may be a smartphone, tablet, smartwatch, or other wearable device. The electronic device 100 includes a printed circuit board (PCB) 99 having various components mounted thereon. Conductive traces 97 printed on the PCB 99 serve to electrically couple the various components together in a desired fashion.

A system on chip (SoC) 116, which comprises a central processing unit (CPU) 117 coupled to a graphics processing unit (GPU) 119, is mounted on the PCB 99. Coupled to the SoC 116 are a transceiver 101 via which the SoC 116 can communicate with remote servers over the internet, and a touch sensitive display 103 via which the SoC 116 may display output and receive input. A variety of sensors are coupled to the SoC 116, including a light sensor 102 for determining the level of ambient light in the environment in which the electronic device 100 resides, a magnetometer 104 used to determine the orientation of the electronic device 100 with respect to the magnetic field of the Earth, a barometer 106 used to determine the air pressure in the environment (and thus, the altitude of the electronic device 100), a microphone 114 used to detect audible noises in the environment, and a proximity sensor 118 used to determine proximity of the user with respect to the electronic device 100.

A configurable sensor unit 107 is mounted on the PCB 99 spaced apart from the SoC 116, and coupled thereto by the conductive traces 97. The configurable sensor unit 107 includes an accelerometer 108 and/or gyroscope 110 coupled to a control circuit 112. The accelerometer 108 is used for determining accelerations experienced by the electronic device 100, and the gyroscope 110 is used to determining an orientation of the electronic device 100 with respect to the environment. The configurable sensor unit 107 may be formed from discrete components and/or integrated components and/or a combination of discrete components and integrated components, and may be formed as a package.

It should be understood that the configurable sensor unit 107 is not a portion of the SoC 116, and is a separate and distinct component from the SoC 116. Indeed, the sensor unit 107 and the SoC 116 are separate, distinct, mutually exclusive chips mounted on the PCB 99 at different locations and coupled together via the conductive traces 97.

In operation, the SoC 116 may acquire data from the various sensors 102, 103, 104, 106, 114, and 118 at an acquisition rate, and may process the data so as to determine a context of the electronic device 100 relative to its environment. The acquisition rate for these various sensors (with the exception of the touch sensitive display 103) may be relatively low due to the nature of the contexts to be determined from these sensors not necessitating a higher acquisition rate. Therefore, power consumption as a result of acquisition of data from these various sensors may be relatively low. Contexts will be explained below in detail.

On the other hand, the contexts to be determined from the accelerometer 108 and/or the gyroscope 100 may involve the use of a higher acquisition rate than the other sensors. Therefore, the configurable sensor unit 107 is used for data acquisition from the accelerometer 108 and/or the gyroscope 100, as it offers power savings. These power savings are realized by a control circuit 112 of the configurable sensor unit 107 that consumes less power than the SoC 116 performing acquisition of data from the accelerometer 108 and/or the gyroscope 110 and some processing of that data. So as to provide the same level of configurability as would be present were the SoC 116 performing the acquisition and processing of the data from the accelerometer 108 and/or the gyroscope 110, the sensor unit 107 may receive configuration data as input.

In operation, the control circuit 112, as stated, receives the configuration data as input. The control circuit 112 acquires data from the accelerometer 108 and/or the gyroscope 110, and processes the data so as to generate a context of the electronic device 100 relative to its surroundings. This processing is performed by the control circuit 112 using a processing technique operating in accordance with the configuration data received as input. The processed data is then output by the control circuit 112 to the SoC 116 for use thereby.

Figure 2:
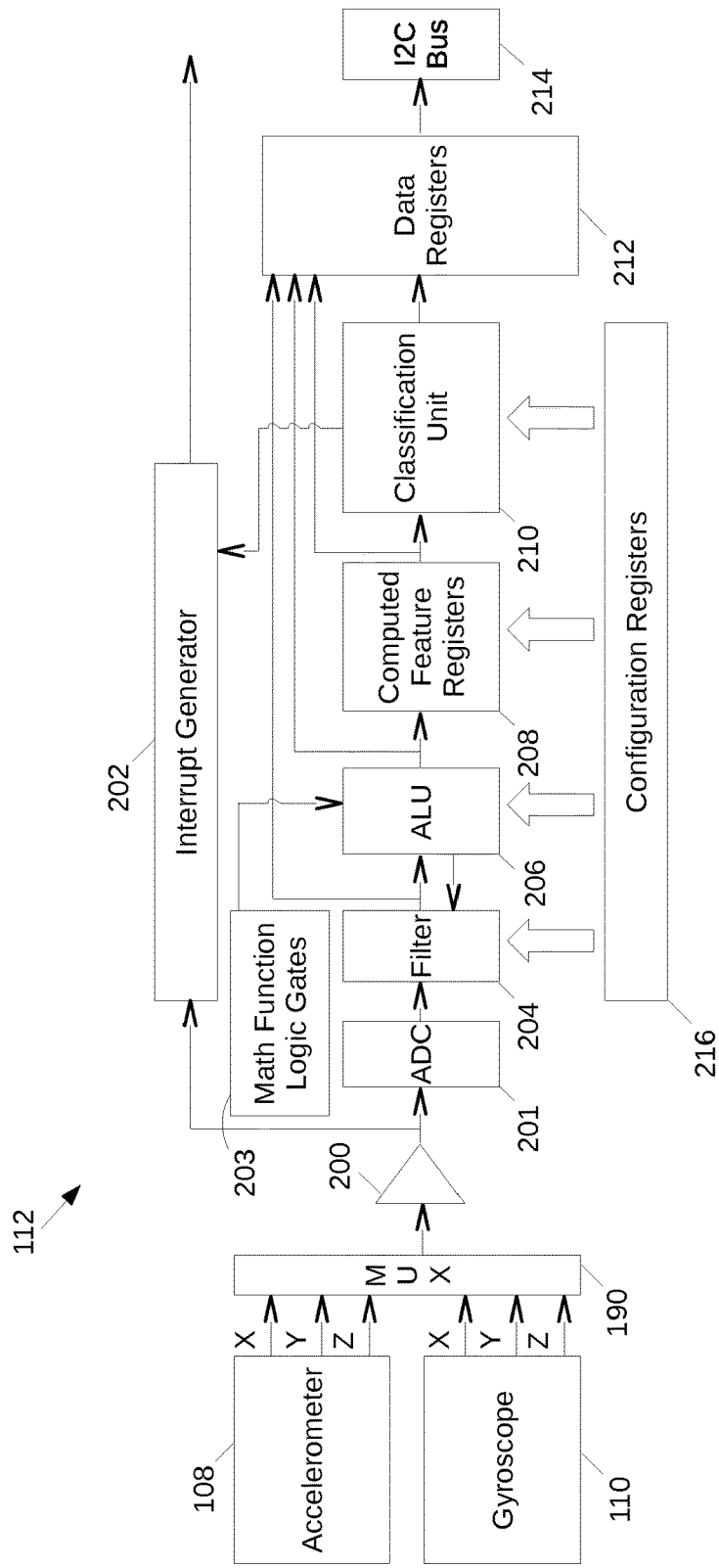
FIG. 2 is a schematic block diagram of the control circuit of the electronic device of FIG. 1.

With additional reference to FIG. 2, sample details of the control circuit 112 are now given. Although specifics will be described, it should be understood that the control circuit 112 may be made from any suitable components, and that any and all such designs are within the scope of this disclosure. It should also be understood that while certain functions and operations are described as being performed by certain components of the control circuit 112, the performance of those functions and operations by any suitable hardware is contemplated and within the scope of this disclosure.

The control circuit 112 includes a multiplexer 190 that receives three dimensional data in the X, Y, and Z directions from the accelerometer 108 and gyroscope 110. The output of the multiplexer 190 is fed to a charge pump 200, which in turn feeds its output to a filter 204. The filter feeds its output to a programmable logic device such as an arithmetic logic unit (ALU) 206, which feeds its output to computed feature registers 208. A classification unit 210 reads data from the computer feature registers 208, and outputs contexts to data registers 212. The data registers 112 are coupled to an I2C bus interface 214. In addition, an interrupt generator 202 is coupled to the output of the charge pump 200, and the output thereof may be read by the SoC 116. Configuration registers 216 are coupled to the filter 204, ALU 206, computed feature registers 208, and classification unit 210. In addition to the connections described above, the outputs of the filter 204, ALU 206, and computed feature registers 208 are also each coupled to the data registers 212.

In operation, the accelerometer 108 and gyroscope 110 each output data for the three spatial dimensions X, Y, Z. This data is received by the multiplexer 190, which selectively multiplexes that data to the charge pump 200. The charge pump 200 outputs that data to the filter 204 which may be an analog or digital filter. The filter 204 filters the data and outputs it to an arithmetic logic unit (ALU) 206.

The ALU 206 serves to extract features of the data itself, such as a mean acceleration over a given period of time, deviance of that mean acceleration, radian acceleration, number of acceleration peaks, number of zero crosses, peak acceleration values, linear acceleration values, energy in bands, mean of roll, pitch, and yaw, variance of roll, pitch, and yaw, mean of linear acceleration, variance of linear acceleration, etc. This list of features that may be extracted from the data is not intended to be exhaustive. Indeed, the ALU may extract any useful features from accelerometer 108 or gyroscope 110 data, and all such features are within the scope of this disclosure.

The computed feature registers 208 store the features extracted by the ALU 206. The classification unit 210 may be a separate ALU, and classifies the context of the electronic device 100 based upon the features extracted by the ALU and stored in the computed feature registers 208. For example, the context of the electronic device 100 may be where on the user's body it is carried (i.e. in pocket, in hand, in holster), a current method of locomotion of the user (i.e. running, walking, driving, bicycling, climbing stairs), or an orientation of the electronic device 100 with respect to gravity. Another example context may be movement of the electronic device 100 in a gesture, such as a user raising a smartwatch in to a position to view the screen thereof, shaking the electronic device 100, double tapping the touch sensitive display 103 of the electronic device 100, rotating the electronic device 100 either clockwise or counterclockwise, and swiping the touch sensitive display 103 to the left, right, top, or bottom.

The contexts classified by the classification unit 210 are then stored in the data registers 212, and may in turn be read out by the I2C bus 214 to the SoC 116. The SoC 116 then uses the classified contexts in its operations. The interrupt generator 202 serves to generate interrupts for the SoC 116 so as to facilitate communication between the configurable sensing unit 107 and the SoC 116.

In some applications, the multiplexer 190 may receive additional data from the SoC 116. For example, the SoC 116 may send additional data from the light sensor 102, magnetometer 104, barometer 106, microphone 114, proximity sensor 118, or touch sensitive display 103 to the multiplexer 190, such that this data may be used by the other components of the sensor unit 107.

The described functionalities of the filter 204, ALU 206, and classification unit 210 operate in accordance with configuration data stored in the configuration registers 216. For example, the configuration data may be changeable parameters of the processing technique performed by the control circuit 112. Thus, the configuration data may change the pre-processing performed by the control circuit 112 by either replacing the filtering technique performed by the filter 204, or by replacing the values of the coefficients of the filter 204.

The configuration data may change the performance level of the sensor unit 107 by altering the balance between latency, accuracy, and power consumption. This balance may be changed by altering the acquisition rate of the data, and thus the rate at which the multiplexer 190 switches from among its various inputs. This balance may also be changed by altering the range of accepted values of the data, for example by the ALU 206 ignoring data outside of the range of accepted values when extracting or computing features of the data.

The configuration data may change the techniques used by the ALU 206 to extract and compute the features from the data. The ALU 206 may be programmed to extract and compute a plurality of features from the data, and the configuration data may serve to select a subset of that plurality of features for the ALU 206 to actually extract and compute. In some cases, the configuration data may program or reprogram the ALU 206 for extracting and computing different features. The configuration data may also program or reprogram the way in which the ALU 206 extracts and computes any of the features.

The balance between latency, accuracy, and power consumption may also be altered by the configuration data switching operation of the sensor unit 107 between a lower power consumption mode and a higher power consumption mode. In the lower power consumption mode, the ALU 206 extracts and computes a smaller subset of features of the plurality of features which the ALU 206 is programmed to extract and compute, whereas in the higher power consumption mode, the ALU 206 extracts and computes a larger subset (or all) of the features of the plurality of features which the ALU 206 is programmed to extract and compute. When these lower and higher power consumption modes are used, the sensor unit 107 operates in the lower power consumption mode until features of a threshold value or values are extracted by the ALU 206, at which point the sensor unit 107 switches to operation in the higher power consumption mode.

The configuration data may change the techniques used by the classification unit 210 for classifying the features extracted and computed by the ALU 206 and stored in the computed feature registers 208, for example by using a decision tree. The classification unit 210 may be programmed to classify the features into a plurality of contexts, and the configuration data may select a subset of that plurality of contexts for the classification unit 210 to classify. In addition, the configuration data may program or reprogram the classification unit 210 for classifying and determining different contexts. The configuration data may also program or reprogram the way in which the classification unit 210 classifies and determines the different contexts.

The SoC 116 may receive additional or new configuration data from the transceiver 101, and it may then pass this additional or new configuration data to the configuration registers 216. In some instances, the SoC 116 may generate the additional or new configuration data itself, for example based upon user input, and then pass the additional or new configuration data to the configuration registers 216.

It should be understood that the configuration data stored in the configuration registers 216 may operate on the various components in a variety of ways. For example, the configuration data may directly provide the techniques or algorithms used by the various components, may select which pre-programmed techniques or algorithms are to be used, may provide the coefficients used by the techniques or algorithms, or may replace standard techniques, algorithms, or coefficients. Thus, the various components may operate in a first fashion in the absence of the configuration data, and in a second fashion in the presence of the configuration data. The configuration registers 216 are reprogrammable on the fly by the SoC 116, and thus the alteration of the operation of the sensor unit 107 may not involve the changing of firmware. Therefore, the various components may be considered to be fully programmed at a first point in time, and that programming may be changed by the configuration data at a second point in time.

In addition to the power savings provided by this sensor unit 107, the sensor unit 107 facilitates easier manufacture of electronic devices 100. Due to the configuration data being easily changeable in the configuration registers 116, different sensor units 107 need not be stocked by a manufacturer for different electronic devices 100. The same design of sensor unit 107 may be used by a manufacturer for different electronic devices 100, with differences in the configuration data stored in the configuration registers 116 of each, thereby easing manufacturing supply chain constraints.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. An electronic device, comprising:
    a printed circuit board (PCB) having at least one conductive trace thereon;
    a system on chip (SoC) mounted on the PCB and electrically coupled to the at least one conductive trace; and
    a sensor chip mounted on the PCB in a spaced apart relation with the SoC and electrically coupled to the at least one conductive trace such that the sensor chip and SoC are electrically coupled;
    wherein the sensor chip comprises:
        an accelerometer and/or gyroscope; and
        a control circuit configured to:
            receive configuration data as input,
            acquire data from the accelerometer and/or the gyroscope,
            process the acquired data so as to generate a context of the electronic device relative to its surroundings, the processing being performed using a processing technique operating in accordance with the configuration data, wherein the configuration data comprises changeable parameters of the processing technique, and
            output the context, wherein the context of the electronic device relative to its surroundings comprises at least one of a mode of locomotion of a user carrying the electronic device, a position of the electronic device on the body of the user, and a gesture in which the electronic device has been moved.

2. The electronic device of claim 1, further comprising at least one additional sensor; wherein the SoC is configured to acquire additional data from the at least one additional sensor; and wherein the control circuit is further configured to receive the additional data from the SoC, and to process the acquired data and the additional data when generating the context of the electronic device relative to its surroundings.

3. The electronic device of claim 2, wherein the at least one additional sensor is selected from a group consisting of: a barometer, a magnetometer, a proximity sensor, a microphone, a touch sensitive display, and a light sensor.

4. The electronic device of claim 1, further comprising a transceiver; wherein the SoC is configured to receive, via the transceiver, updated configuration data from an external server; and wherein the control circuit is configured to process the acquired data so as to generate the context of the electronic device relative to its surroundings, the processing being performed using the processing technique operating in accordance with the updated configuration data.

5. The electronic device of claim 1, wherein the control circuit comprises a plurality of configuration registers into which the configuration data is received as input.

6. The electronic device of claim 5, wherein the control circuit further comprises a programmable logic device configured to perform the processing using the processing technique in accordance with the configuration data from the plurality of configuration registers.

7. A sensor chip mounted on a printed circuit board (PCB) and electrically coupled to a system on chip (SoC) mounted on the PCB via at least one conductive trace to form an electronic device, the sensor chip comprising:
    an accelerometer and/or a gyroscope; and
    a control circuit configured to:
        receive configuration data as input,
        acquire data from the accelerometer and/or the gyroscope,
        process the acquired data so as to generate a context of the electronic device relative to its surroundings, the processing being performed in using a processing technique operating in accordance with the configuration data, wherein the configuration data comprises changeable parameters of the processing technique, and
        output the context, wherein the context of the electronic device relative to its surroundings comprises at least one of a mode of locomotion of a user carrying the electronic device, a position of the electronic device on the body of the user, and a gesture in which the electronic device has been moved.

8. The sensor chip of claim 7, wherein the control circuit comprises a plurality of configuration registers into which the configuration data is received as input.

9. The sensor chip of claim 8, wherein the control circuit further comprises a programmable logic device configured to perform the processing using the processing technique in accordance with the configuration data from the plurality of configuration registers.

10. The sensor chip of claim 7, wherein the control circuit is further configured to receive additional data from the SoC, and to process the acquired data and the additional data when generating the context of the electronic device relative to its surroundings.

11. The sensor chip of claim 7, wherein the changeable parameters comprise latency and/or accuracy and/or power consumption.

12. The sensor chip of claim 7, wherein the changeable parameters comprise an acquisition rate of the acquired data and/or a range of accepted values of the acquired data.

13. The sensor chip of claim 7, wherein the changeable parameters comprise parameters of a digital filter applied by the processing technique.

14. The sensor chip of claim 7, wherein the changeable parameters comprise first and second processing algorithms to be used by the processing technique in respective first and second modes, the second mode being a higher power consumption mode than the first mode.

15. The sensor chip of claim 7, wherein the context of the electronic device relative to its surroundings comprises a location of the electronic device relative to a body of its user.

16. The sensor chip of claim 7, wherein the context of the electronic device relative to its surroundings comprises movement of the electronic device in a gesture indicating that a user thereof is intending to look at the electronic device.

17. The sensor chip of claim 7, wherein the context of the electronic device relative to its surroundings comprises a form of locomotion currently being employed by a user of the electronic device.

18. The sensor chip of claim 7, wherein the configuration data comprises which features of the acquired data to compute.

19. The sensor chip of claim 18, wherein the features of the acquired data are selected from a group consisting of: a mean acceleration of the electronic device, a deviance of acceleration of the electronic device, rotational acceleration of the electronic device, linear acceleration of the electronic device, a mean of roll, pitch, and yaw, a variance of roll, pitch, and yaw, a number of acceleration peaks in the data over a given period of time, a number of zero crossings in the data over a given period of time, peak values of the data over a given period of time, and magnitudes of acceleration of the electronic device at different points in time.

20. The sensor chip of claim 7, wherein the control circuit is further configured to receive updated configuration data from an external server; and wherein the control circuit is configured to process the acquired data so as to generate the context of the electronic device relative to its surroundings, by performing the processing using the processing technique operating in accordance with the updated configuration data.

21. The sensor chip of claim 7, wherein the control circuit is further configured to receive updated configuration data from the SoC; and wherein the control circuit is configured to process the acquired data so as to generate the context of the electronic device relative to its surroundings, by performing the processing using the processing technique operating in accordance with the updated configuration data.

22. A sensor chip mounted on a printed circuit board (PCB) and electrically coupled to a system on chip (SoC) mounted on the PCB via at least one conductive trace to form an electronic device, the sensor chip comprising:
   an accelerometer and/or a gyroscope; and
   a control circuit configured to:
      receive configuration data as input,
      acquire data from the accelerometer and/or the gyroscope,
      process the acquired data so as to generate a context of the electronic device relative to its surroundings, the processing being performed in using a processing technique operating in accordance with the configuration data, and
      output the context;
   wherein the configuration data comprises changeable parameters of the processing technique.

23. The sensor chip of claim 21, wherein the changeable parameters of the processing technique comprise parameters of a digital filter applied by the processing technique.

24. The sensor chip of claim 23, wherein the changeable parameters comprise latency and/or accuracy and/or power consumption.

25. The sensor chip of claim 23, wherein the changeable parameters comprise an acquisition rate of the acquired data and/or a range of accepted values of the acquired data.

26. A sensor chip mounted on a printed circuit board (PCB) and electrically coupled to a system on chip (SoC) mounted on the PCB via at least one conductive trace to form an electronic device, the sensor chip comprising:
   an accelerometer and/or a gyroscope; and
   a control circuit configured to:
      receive configuration data as input,
      acquire data from the accelerometer and/or the gyroscope,
      process the acquired data so as to generate a context of the electronic device relative to its surroundings, the processing being performed in using a processing technique operating in accordance with the configuration data, and
      output the context;
   wherein the configuration data comprises which features of the acquired data to compute, and
   wherein the features of the acquired data are selected from a group consisting of: a mean acceleration of the electronic device, a deviance of acceleration of the electronic device, rotational acceleration of the electronic device, linear acceleration of the electronic device, a mean of roll, pitch, and yaw, a variance of roll, pitch, and yaw, a number of acceleration peaks in the data over a given period of time, a number of zero crossings in the data over a given period of time, peak values of the data over a given period of time, and magnitudes of acceleration of the electronic device at different points in time.

27. The sensor chip of claim 26, wherein the configuration data comprises changeable parameters of the processing technique; and wherein the control circuit is further configured to receive updated configuration data from an external server; and wherein the control circuit is configured to process the acquired data so as to generate the context of the electronic device relative to its surroundings, by performing the processing using the processing technique operating in accordance with the updated configuration data.

28. The sensor chip of claim 26, wherein the control circuit is further configured to receive updated configuration data from the SoC; and wherein the control circuit is configured to process the acquired data so as to generate the context of the electronic device relative to its surroundings, by performing the processing using the processing technique operating in accordance with the updated configuration data.

* * * * *